Patented Aug. 2, 1932

1,869,667

UNITED STATES PATENT OFFICE

JACK CHURCHWARD, OF NEW HAVEN, CONNECTICUT

ALUMINUM ARC WELDING

No Drawing. Application filed July 8, 1922, Serial No. 573,736. Renewed December 15, 1931.

This invention relates to arc welding, and is herein disclosed as applied to the welding of aluminum with an aluminum electrode.

It has heretofore been generally supposed that aluminum could be welded by an electric arc only when a carbon electrode was used, and the aluminum puddled in. Even this method was often unsatisfactory and could not be used for overhead welding.

According to the present invention, an aluminum electrode is used for welding, the electrode being suitably modified with ingredients adapted to control the flow of metal and its volatilization by the arc. According to the present invention, a relatively easily volatile metal, such as zinc, is alloyed with the aluminum. The most satisfactory work has been accomplished when the electric welding was done with what would ordinarily be called in the art reversed polarity, that is to say, when the electrode is the positive pole and the work the negative pole. The electrode is preferably coated with a suitable coating, such as carbonate of lime, and is then wound with cord. It has been found that satisfactory welding can be accomplished with an untreated and dry cord covering, although the burning of the cord, if dry and not otherwise treated, is something of an annoyance, and the most satisfactory results have been obtained with a cord dipped in water, or soaked in a saturated solution of zinc chloride after the cord is wound upon the electrode. Used thus, overhead welding has proved to be easily effected.

In one instance, the aluminum intake manifold on a Pierce motor truck was welded by heating the whole casting with a gas torch to about 300 Fahr. and then work was started by welding the crack at one end and working along the crack until it was entirely repaired by welding. The only precaution needed was to avoid concentrating the arc so long on any point of the aluminum that some of the aluminum was likely to melt and drop out. It was found to be easier to weld the aluminum than cast iron, although not quite as easy to weld as steel. It is necessary to hold the arc on one spot slightly longer than on steel.

In welding aluminum to repair an opening made through a truck crank casting by a connecting rod, the part to be welded was heated by a gas torch to about 300 Fahr. and a bead, about an inch long, was welded around the edge; then, after waiting for about ten seconds for this to cool, a second bead was welded onto the first, and so on. It was only necessary to hold the arc on one spot a little longer than on steel.

In one test, a three-sixteenths inch electrode of aluminum, containing 23% of zinc, worked very satisfactorily, using it as the positive pole with a voltage varying from 50 volts no-load to 37 volts full-load, and a current varying from 140 to 120 amperes. The voltage across the arc was 25 to 30 volts. With an eighth-inch electrode successful work was done with a current carrying 45 amperes, with slightly less voltage across the arc.

In another test, a one-fourth inch cast aluminum rod containing silicon 0.12%; copper 1.38%; iron 1.76%; manganese, trace; zinc 17.55%; aluminum (by difference) 79.19% was wrapped with cotton string, which had been soaked in a solution of zinc chloride and water. Ordinary cotton string was used, having a diameter of approximately one-sixteenth of an inch. In this case, the rod was allowed to dry, after being wrapped with the saturated string, and the electrode was used on a circuit having a voltage of about 45 volts. A perfect weld resulted.

In another test, an aluminum wire electrode, containing 8% of zinc was used. In this case, the zinc chloride used was of the commercial article. After wrapping the wire with the saturated string, a basic material such as calcium carbonate, made into a paste with water, was smeared onto the wire with the fingers. It was also found that zinc chloride was unnecessary. Merely dipping the wrapped electrode in water, after having coated it with calcium carbonate, gave excellent results.

From the above examples, it is evident that it has been determined that preheating is not always necessary for successful welding.

Some of the best results were obtained with the three-sixteenths inch rod containing 77% of aluminum and 23% of zinc, both including the usual impurities, when this was dipped in a cream of orange shellac varnish solution, containing a large amount of calcium carbonate and only enough shellac to make a binder. The rod was then dried and wrapped with dry string and afterwards soaked in a saturated solution of zinc chloride.

In another instance, the support arm on an automobile crank case was welded while the crank case was still attached to the engine without preheating, by using an alloy containing 23% zinc, balance aluminum, with usual commercial impurities, the voltage and amperes being the same as in the other instances.

The best results have been obtained when zinc is alloyed in the aluminum.

Having thus described certain embodiments of my invention, what I claim is:

1. The process of arc welding aluminum comprising applying to the work to be welded an electrode consisting largely of aluminum, and so directing a welding current through the work and the electrode than an arc is formed therebetween and a positive polarity is established in the electrode.

2. The process of arc welding aluminum comprising applying to the work to be welded an electrode consisting of an aluminum alloy, and so directing a welding current through the work and the electrode that an arc is formed therebetween and a positive polarity is established in the electrode.

3. The process of arc welding aluminum comprising applying to the work to be welded an electrode consisting of aluminum having a smaller but considerable proportion of relatively volatile material associated therewith, and so directing a welding current through the work and the electrode as to form an arc therebetween and establish positive polarity in the electrode.

4. The process of electric arc welding comprising applying to the work an electrode of aluminum containing zinc, and so directing a welding current through the work and the electrode as to form an arc therebetween and establish a positive polarity in the electrode.

5. An electrode for welding aluminum and adapted to be used as a positive pole during the welding operation, comprising 8% to 23% zinc and 77% to 92% of aluminum.

6. The process of arc welding aluminum which comprises preheating the work to approximately 300° F. and applying to the work to be welded an electrode consisting largely of aluminum and so directing a welding current through the work and the electrode that an arc is formed therebetween and a positive polarity is established in the electrode.

7. The process of arc welding aluminum which comprises preheating the work, applying to the work to be welded an electrode consisting largely of aluminum, and so directing a welding current through the work and the electrode that an arc is formed therebetween and a positive polarity is established in the electrode.

8. The process of arc welding aluminum which comprises preheating the work, applying to the work to be welded an electrode consisting of an aluminum alloy, and so directing a welding current through the work and the electrode that an arc is formed therebetween and a positive polarity is established in the electrode.

9. The process of arc welding aluminum which comprises preheating the work, applying to the work to be welded an electrode consisting of aluminum having a smaller but considerable proportion of relatively volatile material associated therewith, and so directing a welding current through the work and the electrode as to form an arc therebetween and establish positive polarity in the electrode.

10. The process of electric arc welding which comprises preheating the work to approximately 300° F., applying to the work an electrode of aluminum containing a quantity of relatively volatile unlike material, and so directing a welding current through the work and electrode that an arc is formed therebetween and a positive polarity is established in the electrode.

11. The process of electric arc welding which comprises preheating the work, applying to the work an electrode of aluminum containing zinc, and so directing a welding current through the work and the electrode as to form an arc therebetween and establish a positive polarity in the electrode.

12. The process of arc welding aluminum which comprises applying to the work to be welded an aluminum-zinc alloy electrode, and so directing a welding current through the electrode and the work that an arc is formed therebetween and a positive polarity is established in the electrode.

13. The process of arc welding which comprises applying to the work to be welded an electrode comprising approximately 77% to 92% of aluminum and 23% to 8% of zinc, and so directing a welding current through the work and the electrode that an arc is formed therebetween and a positive polarity is established in the electrode.

14. The process of arc welding aluminum which comprises preheating the work to approximately 300° F., applying to the work to be welded an electrode comprising approximately 77% of aluminum and 23% of zinc, and so directing the welding current through the work and the electrode that an arc is formed therebetween and a positive polarity is established in the electrode.

15. An electrode for welding aluminum comprising an alloy containing approximately 77% of aluminum and 23% of zinc.

16. An electrode for welding aluminum comprising an alloy containing approximately 77% of aluminum, 23% of zinc, and having a coating of a calcium carbonate thereon and a fibrous envelope surrounding said electrode.

17. An electrode comprising an alloy containing approximately 77% aluminum, 23% zinc, and having a coating of calcium carbonate thereon and a fibrous envelope surrounding the electrode, said envelope being impregnated with a material to retard the burning of the envelope when the electrode is used for welding.

In testimony whereof, I have affixed my signature to this specification.

JACK CHURCHWARD.